(No Model.)
W. SCHAUWEKER.
NUT LOCK.
No. 470,708. Patented Mar. 15, 1892.
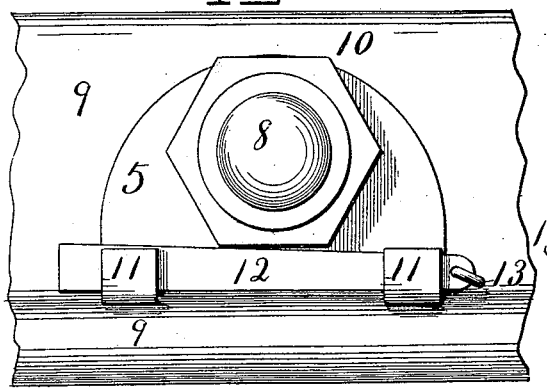
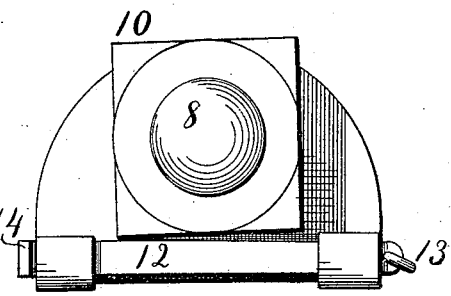
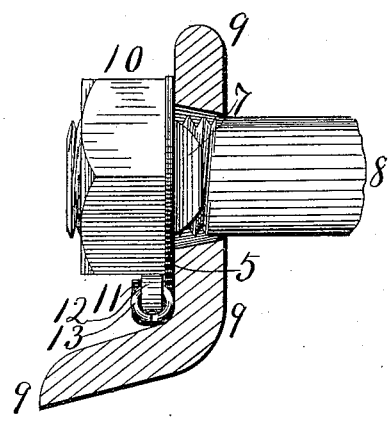
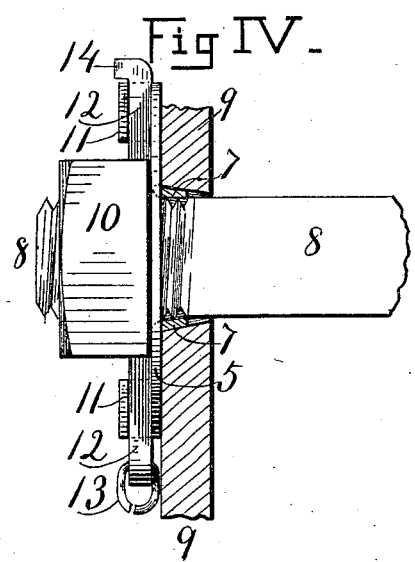
WITNESSES,
P. E. Stevens.
M. C. Hillyard.
INVENTOR.
William Schauweker,
By H. X. Stevens, Atty.

UNITED STATES PATENT OFFICE.

WILLIAM SCHAUWEKER, OF PITTSBURG, PENNSYLVANIA.

NUT-LOCK.

SPECIFICATION forming part of Letters Patent No. 470,708, dated March 15, 1892.

Application filed December 8, 1891. Serial No. 414,401. (No model.)

*To all whom it may concern:*

Be it known that I, WILLIAM SCHAUWEKER, a citizen of the United States, residing at Pittsburg, in the county of Allegheny and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to that class of devices which are used in connection with screw-nuts to prevent the same being jarred loose from the screws or bolts upon which they are placed for service; and its object is to secure in place that class of nuts which are used upon bolts that fasten fish-plates to railroad-rails.

To this end my invention consists in the construction and combination of parts forming a "nut-lock," hereinafter described and claimed, reference being had to the accompanying drawings, in which—

Figure I is a face view of a nut-lock according to my invention applied to a hexagon nut. Fig. II is a similar view of my nut-lock as applied to a square nut. Fig. III is a side view of my nut-lock, showing the fish-plate in vertical section on the central line of the bolt; and Fig. IV is a top view of the same, showing the fish-plate in horizontal section at the level of the bolt.

5 represents the body of my nut-lock, which is preferably made of sheet-steel of suitable thickness, punched into shape. The central hole is partly punched and partly swaged, so as to push the lips 7 through beyond the back of the plate, leaving a space or hole between these lips sufficiently large for the bolt 8 to pass freely through.

9 represents a fish-plate having a tapering hole for the bolt to pass through, the mouth or flaring end of the hole being at the outer side of the plate and large enough to admit the edges of the lips 7, so that when the nut 10 is screwed upon the bolt the body 5 of the lock in being crowded home against the fish-plate 9 has its lips 7 wedged together upon the body of the bolt by the wedging form of the sides of the said hole in the fish-plate. By this means the bolt is rigidly and firmly held in its place, so that it cannot be turned by the constant jar of service, and the tendency of the bolt to become loose in the nut is obviated.

11 represents two ears of the body 5 bent forward and upward to form a guideway or slot to receive the key 12, which is a wedge of sufficient thickness to impinge against the side of the nut when the wedge is driven home in the said slot. Before the key is put into position the nut may be freely turned against the body 5, the corners of the nut passing between the ears 11. The flange portion of the fish-plate may extend forward below the nut, as is quite common, and the ears 11 should extend far enough below the nut to nearly rest on said flange, as shown in Fig. III, and they should also extend far enough to the right and left of the nut, as shown in Figs. I and II, to be prevented by the flange from revolving, and thereby to prevent both the bolt, which is held by lips 7, and the nut, which is held by the wedge or key 12 in the said ears 11, from being turned loose. It is evident that the flange of the fish-plate may be dispensed with; but, as herewith shown, it is shaped to rest on the common flange of a rail, and if it were removed the flange of the rail would serve the same purpose of preventing the lock-plate from turning; but in that case the ears 11 should be proportioned in length to nearly rest on the said flange.

For the purposes of the claims the fish-plate or whatever the lock rests on is the lock-seat, and either a flange upon the fish-plate or a flange upon the rail is referred to as a flange extending forward of the lock-seat.

13 is a piece of wire passing through the end of the key 12 to prevent the same being worked out of its seat in the ears if it should become a little loose. This wire may be bent into a ring or other suitable form to prevent it from working loose.

Whenever it is necessary to unlock a nut fastened by my lock, the wire 13 must first be removed and the key driven out. That will permit the nut to be turned loose, after which the body of the lock may be pried loose from the bolt with a crow-bar.

As there is little or no bending of any part of this lock required in service, it is evident that it may be applied and removed an indefinite number of times without being materially damaged thereby, except the little bit of wire, which is so inexpensive that it might be thrown away at every removal without any loss worth mentioning.

It is evident that the body of the lock might be readily cast of malleable iron or steel and serve the purpose described; but I prefer to make it of tough sheet metal, such as tough sheet-iron or Bessemer steel.

In order to tighten a nut which may have become loose after long service, it is necessary to first remove the wire from the key and then remove the key from the lock, and after the nut has been turned home the key and wire may be replaced. If it should be found advantageous to leave the nut a little loose upon the bolt to permit the same to yield somewhat in service, the nut may still be prevented from turning off by means of my lock and key, as shown in Fig. II. As this lock does not depend on the perfect tightness of its parts for its permanence in position, it is evident that the key may be in the form of a wedge, wide enough to bear firmly against the side of the nut at all times, or it may be made narrow enough to leave the nut a little play, and the key may be provided with any suitable head 14 to prevent its being worked out of the slot. Of course this lock may rest upon other seats than fish-plates, provided the seat has the tapering hole described, and some advantage would accrue from the use of the rest of this device, even if the lips 7 were left off and the body of the bolt were held from turning by other means. The end of the key might be bent, instead of using the wire 13, to prevent its removal.

Having thus fully described my invention, what I believe to be new, and desire to secure by Letters Patent, is the following:

1. The combination, in a nut-lock, of a body portion having a hole through it with lips at the side of the hole projecting rearward from the body and adapted to be closed a little toward each other, a seat for the nut perforated to receive a bolt, the walls of the perforation being inclined to form a flaring mouth, whereby the lips will be wedged against the bolt-body, and means for holding the nut, substantially as described.

2. The combination of a nut-lock body perforated to receive a bolt and having lips to engage the body thereof, and further having ears projecting forward and upward in the form of a slot, a key fitted to the said slot to engage a side of a nut on the bolt, a lock-seat, and a permanently-fixed flange extending forward thereof beneath the nut, the said ears being adapted to engage the said flange, substantially as described, whereby the lock-body, the nut, and the bolt will all be held from turning.

In testimony whereof I affix my signature in presence of two witnesses.

WILLIAM SCHAUWEKER.

Witnesses:
W. X. STEVENS,
M. C. HILLYARD.